June 12, 1934.  W. L. PATTERSON  1,962,834
BINOCULAR MICROSCOPE
Filed Aug. 26, 1930  2 Sheets-Sheet 1
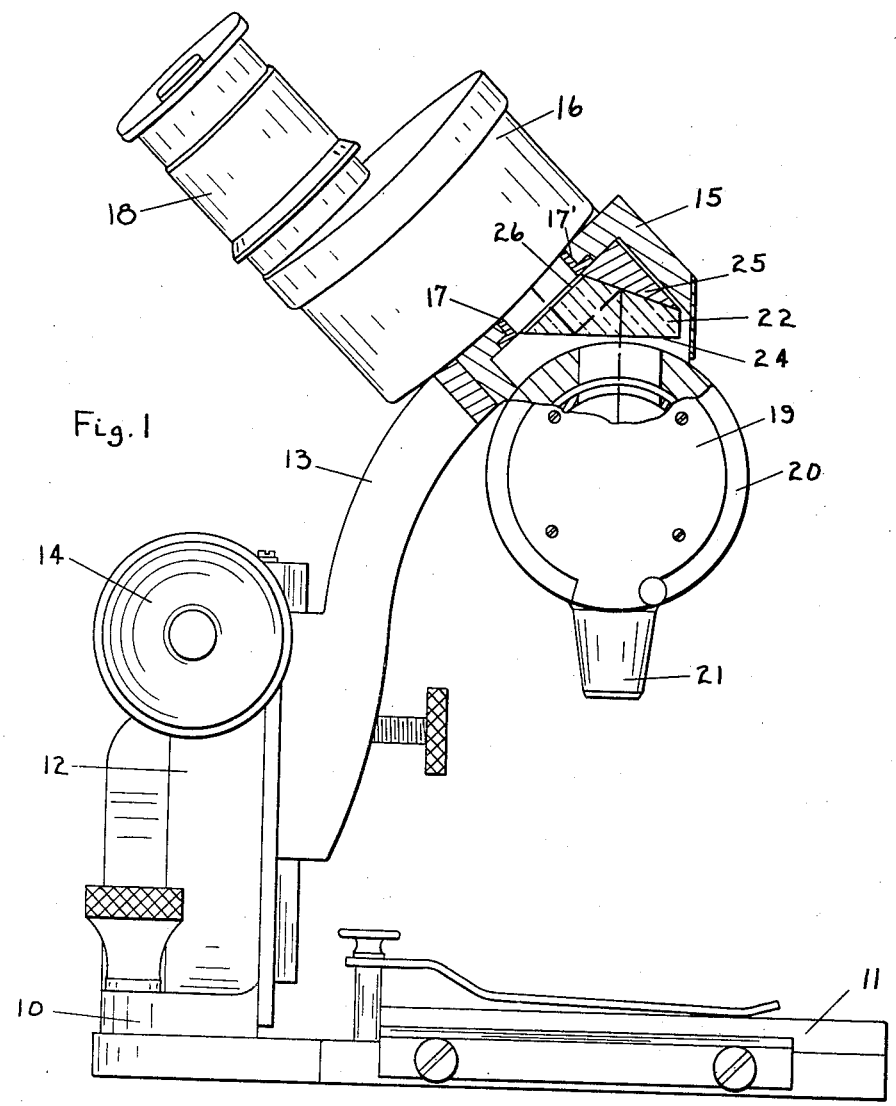
WILLIAM L. PATTERSON
INVENTOR
BY G. A. Ellestad
ATTORNEY June 12, 1934.  W. L. PATTERSON  1,962,834
BINOCULAR MICROSCOPE
Filed Aug. 26, 1930  2 Sheets-Sheet 2
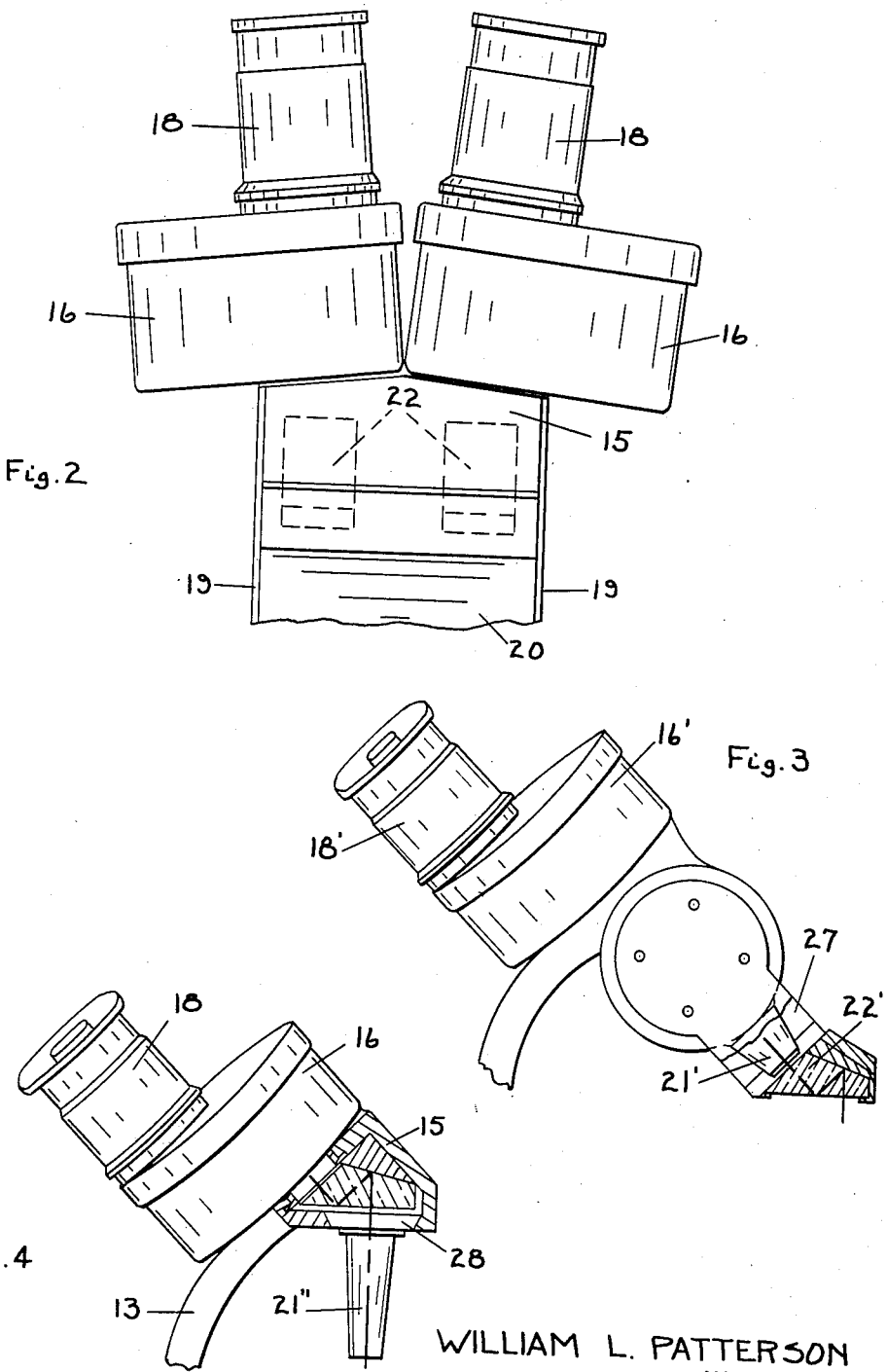
WILLIAM L. PATTERSON
INVENTOR
BY  *J. A. Ellestad*
ATTORNEY Patented June 12, 1934

1,962,834

UNITED STATES PATENT OFFICE 1,962,834

BINOCULAR MICROSCOPE

William L. Patterson, Rochester, N. Y., assignor to Bausch & Lomb Optical Company, Rochester, N. Y., a corporation of New York Application August 26, 1930, Serial No. 477,836

2 Claims. (Cl. 88—39)

This invention relates to microscopes and more particularly it has reference to microscopes of the binocular type wherein a pair of oculars cooperates with a pair of objectives.

Microscopes of this type are widely used by laboratory research workers for the examination of various specimens, for dissecting and the like. Whenever liquid specimens are examined, as is often the case, it is necessary that the microscope stage be positioned in a substantially horizontal plane. This means that with the commonly used prior art instruments of this type the optical axes of the eye pieces and objectives will lie in substantially vertical planes. Hence, when using such an instrument the microscopist must assume an erect position that is exceedingly tiresome and cramps the muscles of the neck, especially when an instrument is used over a relatively long period of time.

One of the objects of my invention is to provide a microscope of the type described wherein the optical axes of the eye pieces will lie in a plane which is inclined to the vertical plane of the axes of the objectives. Another object is to provide an improved microscope of the character described which has its eye pieces inclined from the vertical plane passing through the objectives while still rendering erect images to the user. Still another object is to provide a microscope of the type described having its eye pieces inclined to a vertical plane which is perpendicular to the stage of the instrument. A further object is to provide an instrument of the character described which will permit a maximum degree of comfort when in use. These and other objects and advantages reside in certain novel features of construction, arrangement and combination of parts as will hereinafter be more fully disclosed and the novel features thereof will be pointed out in the appended claims.

Referring to the drawings:

Fig. 1 is a side elevation of a microscope embodying my invention, with parts shown in section.

Fig. 2 is a fragmentary front elevation of same.

Fig. 3 is a fragmentary view showing a side elevation, partly in section, of a modified form of my invention.

Fig. 4 is a similar view of another modification.

Fig. 5 is a detailed view showing the method of mounting the prisms in the instrument shown in Fig. 1.

One embodiment of my invention is shown in Fig. 1 of the drawings wherein 10 indicates a base which has a stage portion 11. A pillar 12 extends upwardly from the base and carries the adjustable arm 13 which can be moved by the usual rack and pinion mechanism (not shown) upon rotation of knob 14. Secured to the upper end of arm 13 is the casing 15 on which the two prism housings 16 are disposed by means of the depending tubular members 17 which are rotatably mounted in openings 17' in the casing. These tubular members are eccentrically positioned on the prism housings 16 so that rotation of the prism housings will vary the interpupillary distance between the two eye pieces 18 which are mounted on the housings, as will be understood by those skilled in the art. The prism housings contain prism erecting systems (not shown) such as are well known in the art and are of the type disclosed in Letters Patent No. 1,225,167 issued to W. L. Patterson et al on May 8, 1917.

Mounted on casing 15 are the two plates 19 between which is rotatably mounted the cylindrical drum nose piece 20 carrying pairs of objectives 21, such as disclosed in Letters Patent No. 1,622,350 issued to J. C. Sabel on March 29, 1927. Reflecting prisms 22 held by mountings 23 are secured within casing 15 adjacent to the tubular members 17 so that each prism cooperates with its respective objective, erecting system and eye piece. Light rays from the objective 21 are incident normally upon the horizontal surface 24 of prism 22 after which they are totally reflected by the inclined prism surface 25 and are again reflected by the surface 24 from whence they pass out normally to the surface 26 and enter the prism erecting system and the eye piece. Since the light rays are twice reflected by the prism 22 the images in the eye pieces appear erect as they always do in instruments of this kind which employ erecting systems. Such a position of the final image is highly desirable, especially since microscopes of this type are very frequently used for dissecting operations and confusion caused by inverted and reverted images is undesirable.

In the modification shown in Fig. 3, I have shown the reflecting prism 22' held in a mounting 27 in front of the objective 21' which cooperates with the usual prism system (not shown) held in the housing 16' which carries the eye piece 18'. A further modification, shown in Fig. 4, is similar to the structure shown in Fig. 1 and shows the objectives 21'' mounted on a dovetailed slide 28 instead of being carried in the rotatable drum nose piece as in Fig. 1.

From the foregoing, it will be apparent that I am able to attain the objects of my invention and provide an instrument of the type described wherein the optical axes of the eye pieces are inclined to the vertical while still permitting liquid specimens to be held in a horizontal position on a horizontal stage. The inclined eye pieces make it possible for the microscopist to assume an easy, comfortable position so that research workers are spared the discomfort which results from the use of the old type of instrument. The inclination of the eye pieces is, of course, made possible by the use of the reflecting prisms, as will be apparent from the drawings. Since these reflecting prisms cause two successive reflections of the light rays from the objective, the imagery is not disturbed and the images in the eye pieces appear erect just as in the eye pieces of similar microscopes of this type. This is an important feature of my invention since it prevents confusion to the user. Various modifications can obviously be made without departing from the spirit of my invention as pointed out in the appended claims.

I claim:

1. A binocular microscope comprising a support having a horizontal stage, a casing mounted on said support, said casing having a face inclined to the vertical a pair of spaced objectives mounted on said casing, the axes of said objectives lying in a vertical plane, a pair of eye pieces rotatably mounted on the inclined face of said casing, the axes of said eye pieces being rearwardly inclined from the vertical, a pair of prisms mounted in said casing, each of said prisms being adapted to direct light rays from one of said objectives into one of said eye pieces, each of said prisms having a horizontally disposed light-receiving surface and two inclined reflecting surfaces whereby light rays from the objectives are successively reflected before entering the eye pieces.

2. A binocular microscope comprising a support having a horizontal stage, a casing mounted on said support, said casing having a face inclined to the vertical, a pair of spaced objectives carried by the casing, a pair of eye pieces rotatably mounted on said face whereby the axes of said eye pieces are inclined to the vertical, a pair of prisms mounted within said casing and positioned, respectively, to direct light rays from said objectives into said eye pieces.

WILLIAM L. PATTERSON.